United States Patent
Norris et al.

(10) Patent No.: US 12,498,777 B2
(45) Date of Patent: Dec. 16, 2025

(54) DYNAMIC TRANSPORT ARCHITECTURE FOR SUPPORTING FLEXIBLE, OPEN, INTELLIGENT, AND POWER EFFICIENT EDGE-TO-EDGE SERVICES ACROSS NETWORK DOMAINS

(71) Applicant: CIENA CORPORATION, Hanover, MD (US)

(72) Inventors: Richard Norris, Whitchurch (GB); David W. Boertjes, Nepean (CA)

(73) Assignee: CIENA CORPORATION, Hanover, MD (US)

( * ) Notice: Subject to any disclaimer, the term of this patent is extended or adjusted under 35 U.S.C. 154(b) by 91 days.

(21) Appl. No.: 18/429,878

(22) Filed: Feb. 1, 2024

(65) Prior Publication Data
US 2024/0264650 A1      Aug. 8, 2024

Related U.S. Application Data

(60) Provisional application No. 63/483,179, filed on Feb. 3, 2023.

(51) Int. Cl.
| | | |
|---|---|---|
| *G06F 1/00* | (2006.01) | |
| *G06F 1/28* | (2006.01) | |
| *G06Q 10/047* | (2023.01) | |
| *G06F 1/26* | (2006.01) | |

(52) U.S. Cl.
CPC .............. *G06F 1/28* (2013.01); *G06Q 10/047* (2013.01); *G06F 1/26* (2013.01)

(58) Field of Classification Search
CPC .................................. G06F 1/28; G06Q 10/47
USPC ........................................................ 713/330
See application file for complete search history.

(56) References Cited

U.S. PATENT DOCUMENTS

| | | | | |
|---|---|---|---|---|
| 6,701,087 B2* | 3/2004 | Beine | .................. | H04J 14/0297 |
| | | | | 398/5 |
| 8,909,945 B2* | 12/2014 | Rudolf | .................. | H04W 52/46 |
| | | | | 713/300 |
| 9,207,731 B2* | 12/2015 | Chang | ....................... | G06F 1/28 |
| 9,483,510 B2* | 11/2016 | Sitaram | ............... | G06F 11/3034 |
| 10,491,501 B2* | 11/2019 | Armolavicius | ....... | H04L 43/062 |

(Continued)

OTHER PUBLICATIONS

Bojczuk, Iago, et al., "Sustainable Subsea Networks", Funded by a grant from the Internet Society Foundation, Retrieved Feb. 3, 2023, 1 page.

(Continued)

*Primary Examiner* — Volvick Derose
(74) *Attorney, Agent, or Firm* — Guntin & Gust, PLC; Kenneth S. Kwan

(57) ABSTRACT

Aspects of the subject disclosure may include, for example, responsive to a request for an end-to-end service, obtaining power-related data for each of a plurality of network elements, identifying a set of candidate service routes that is each associated with a respective subset of the plurality of network elements, for each of the candidate service routes, calculating at least one power metric based on the power-related data of each network element in the respective subset associated with that candidate service route, resulting in a plurality of power metrics, and presenting or utilizing the plurality of power metrics to facilitate selection of a desirable service route from the set of candidate service routes for the end to end service. Other embodiments are disclosed.

20 Claims, 6 Drawing Sheets

(56) References Cited

U.S. PATENT DOCUMENTS

| | | | | |
|---|---|---|---|---|
| 2009/0248854 | A1* | 10/2009 | Conway | H04L 45/00 709/224 |
| 2010/0229016 | A1* | 9/2010 | Kodama | G06F 11/3062 709/224 |
| 2011/0142060 | A1* | 6/2011 | Manral | H04L 45/12 370/401 |
| 2012/0275346 | A1* | 11/2012 | Wang | H04L 45/48 370/256 |
| 2013/0031244 | A1* | 1/2013 | Zhang | H04L 45/124 709/224 |
| 2015/0018025 | A1* | 1/2015 | Wu | H04W 4/70 455/500 |
| 2017/0025857 | A1* | 1/2017 | Matthews | H02J 50/80 |
| 2018/0227827 | A1* | 8/2018 | Xie | H04W 40/246 |
| 2023/0319734 | A1* | 10/2023 | Liu | H04L 63/00 455/522 |
| 2025/0103120 | A1* | 3/2025 | Ghosh | H04L 45/245 |
| 2025/0106305 | A1* | 3/2025 | Yao | H04L 67/63 |

OTHER PUBLICATIONS

Pasek, Anne, et al., "A Provisional Carbon Footprint of Subsea Cable Systems", Funded by a grant from the Internet Society Foundation, Retrieved Feb. 3, 2023, 1 page.

Sugadev, Anjali, et al., "IMO's Measures: A Potential Model for Sustainability Policy in the Subsea Cable Industry", Funded by a grant from the Internet Society Foundation, Retrieved Feb. 3, 2023, 1 page.

Xingwei, Wang, et al., "A cross-layer optimization based integrated routing and grooming algorithm for green multi-granularity transport networks", Journal of Parallel and Distributed Computing, Elsevier, Amsterdam, NL, vol. 73, No. 6, Mar. 14, 2013 (Mar. 14, 2013), pp. 807-822, XP028552055, ISSN: 0743-7315, DOI: 10.1016/J.JPDC.2013.02.010.

"International Search Report & Written Opinion for Application No. PCT/US2024/014009", May 3, 2024, 13 pages.

* cited by examiner

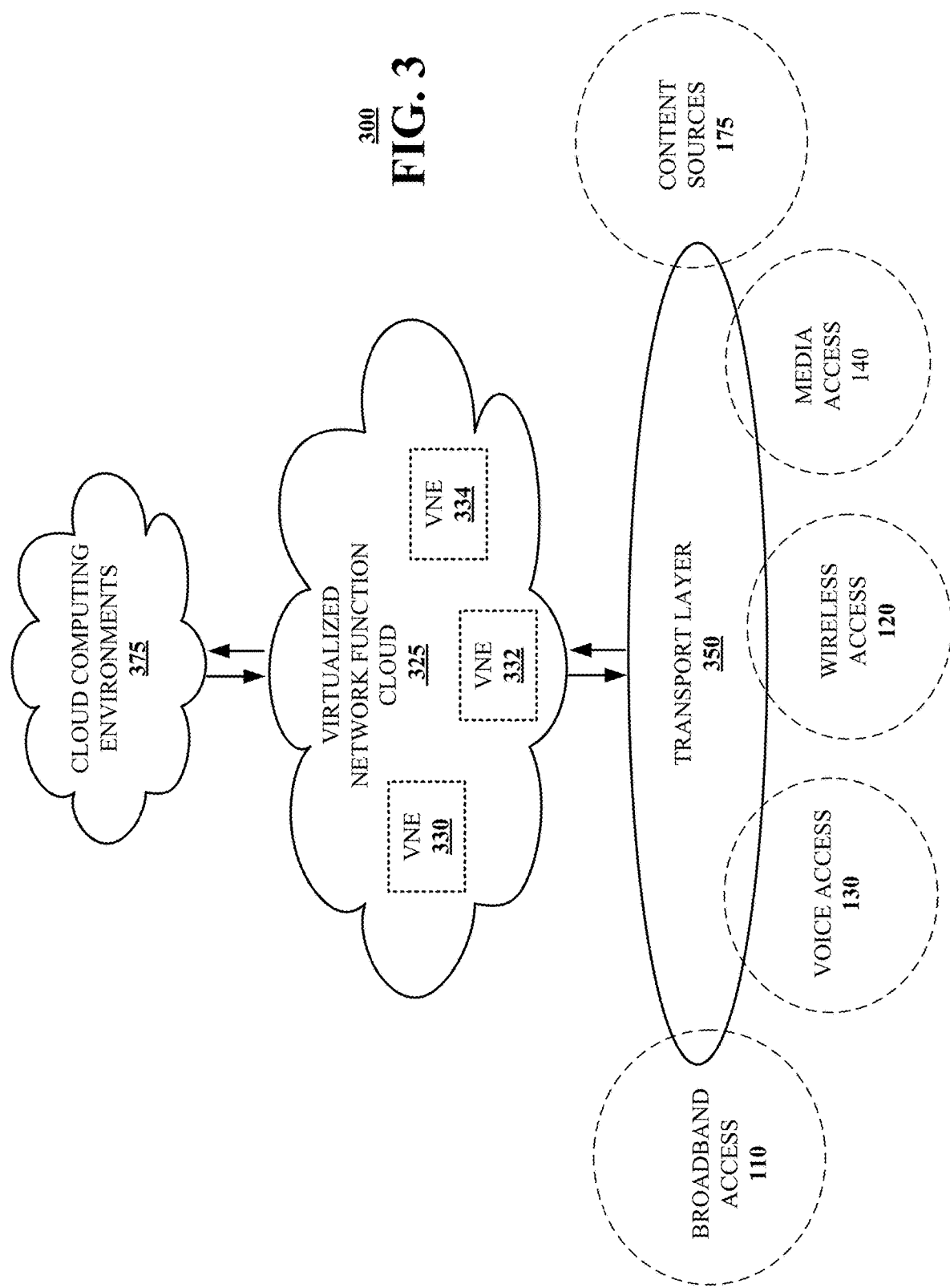

DYNAMIC TRANSPORT ARCHITECTURE FOR SUPPORTING FLEXIBLE, OPEN, INTELLIGENT, AND POWER EFFICIENT EDGE-TO-EDGE SERVICES ACROSS NETWORK DOMAINS

CROSS REFERENCE TO RELATED APPLICATION

This application claims the benefit of U.S. Provisional Patent Application No. 63/483,179 filed on Feb. 3, 2023, the contents of which are hereby incorporated by reference herein in their entirety.

FIELD OF THE DISCLOSURE

The subject disclosure relates to flexible, open, intelligent, and power efficient deployment of edge-to-edge services across different (e.g., submarine, terrestrial, and edge) network domains via open application programming interfaces (APIs).

BACKGROUND

Underlying transport networks are becoming more integrated across global network domains. These domains include submarine networks, terrestrial networks, as well as edge networks. Presently, a transport platform may include, or may be overlaid with, an integrated network portfolio of (e.g., nonhomogeneous) "partner" networks. Integration of such networks provides a "network-as-a-service" (NaaS) configuration that allows end-user network operators or service providers to leverage the overall network for their service deliveries. Networks that employ submarine cable systems are known to have a significant carbon footprint.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communications network in accordance with various aspects described herein.

DETAILED DESCRIPTION

Figure 1:
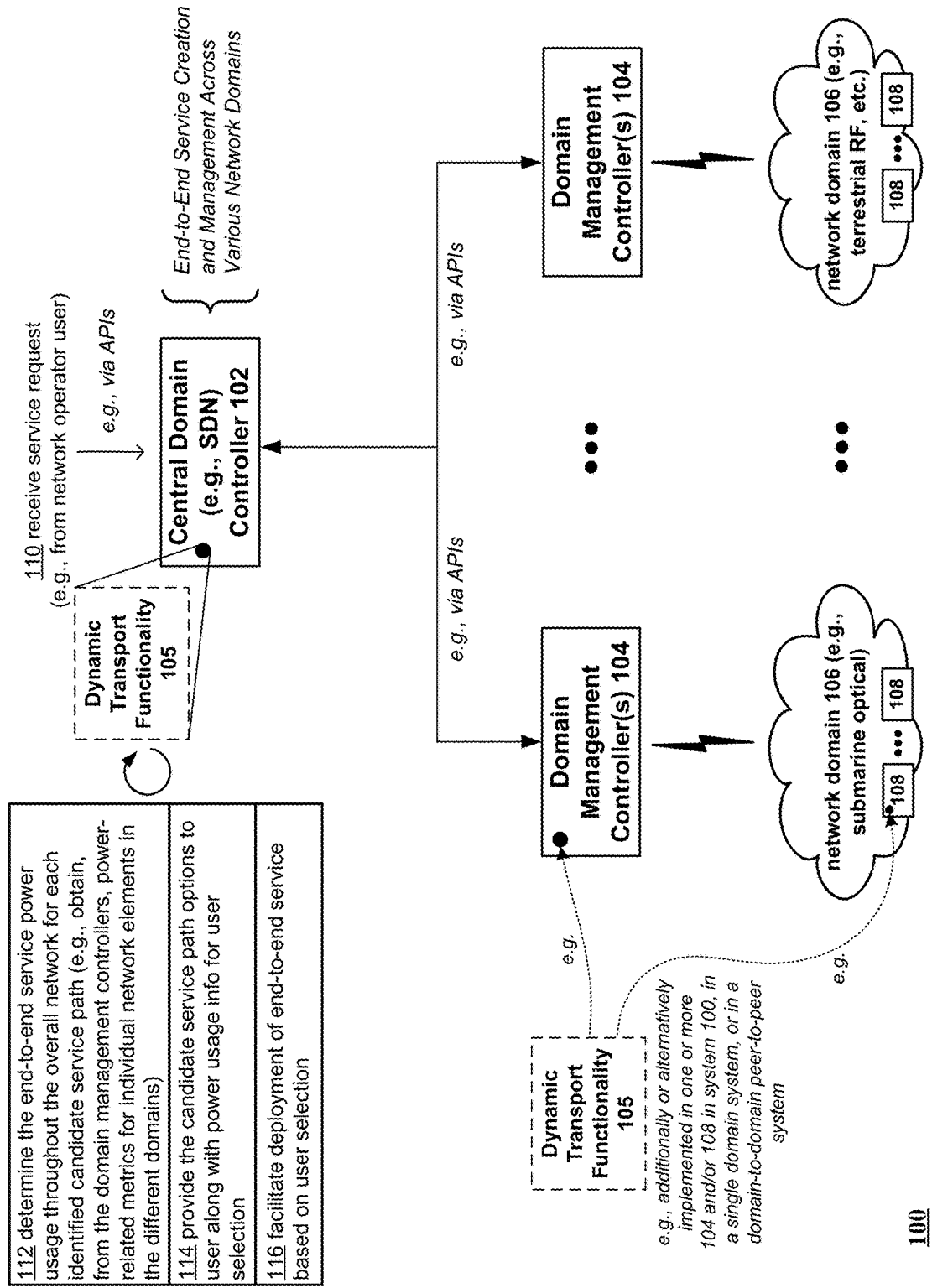
FIG. 1 is a high-level block diagram illustrating an example, non-limiting embodiment of a system functioning within, or operatively overlaid upon, a multi-domain communications network in accordance with various aspects described herein.

Currently, service routing options across transport networks are based on route length and available capacity. Network operators typically select a route that has minimal end-to-end distance and that can be provisioned using available capacity. It is believed that power-related information is generally not available to operators for facilitating service selection based on (e.g., optimal) power routing.

The subject disclosure describes, among other things, illustrative embodiments of a dynamic transport (e.g., management and configuration) system that is capable of facilitating the configuration of edge-to-edge services across different domains while taking into account the power efficiencies of candidate service routes throughout the overall network. Power efficiency, as used herein, may be based on one or more accepted environmentally-related requirements. For instance, a service route involving the usage of environmentally-friendly system(s)/device(s) that consume less power than another set of environmentally-friendly system(s)/device(s) may be deemed more power efficient in a relative sense. These requirements can also be based on or otherwise associated with other environmental factors including carbon emissions.

In exemplary embodiments, the dynamic transport functionality may be implemented in a central domain controller—e.g., a software defined network (SDN) or end-to-end controller—that provides a smart services layer for interacting with users (e.g., network operator users) via one or more (e.g., open) APIs to identify desired service requirements and for interacting with individual domain management controllers of various network domains (e.g., submarine networks, terrestrial networks, etc.) via one or more (e.g., open) APIs to facilitate the creation and deployment of desired edge-to-edge services. In various embodiments, the dynamic transport functionality may be implemented in network elements and corresponding domain management controllers that manage those network elements. In one or more embodiments, a network element (e.g., each network element) may be capable of obtaining (e.g., collecting/gathering/computing/re-computing) power specific metrics, and (e.g., periodically, on-demand, and/or based on certain thresholds being satisfied) advertising those metrics. For instance, network elements (e.g., each network element) may be capable of monitoring and recording different aspects of their power consumption in one or more monitored variables/parameters over time—e.g., current power utilization and/or other power metric, such as power efficiency, power quality, etc.—and providing this information to a corresponding domain management controller, the central domain controller, and/or other network elements. In certain embodiments, network elements (e.g., each network element) may be capable of additionally providing information regarding (or usable to ascertain) device capacity, such as available bandwidth, device latency, and/or the like, to a corresponding domain management controller, the central domain controller, and/or other network elements. In one or more embodiments, the central domain controller may based upon obtaining power-related and capacity-related information, determine power-related values or metric(s) for identified candidate service routes across one or more of the different domains. In certain embodiments, the central domain controller may determine possible routes through the transport network (e.g., that have sufficient capacity based on the service requirements), calculate power-related metric(s) for the various network elements in the different domains to identify end-to-end power metric impact of the service for those possible routes, and cause some or all of the identified candidate service routes and their corresponding power-related values or metric(s) to be provided to a user or routing system or algorithm for review/selection. Power-related metric(s) may include one or more of power consumed per service, power consumed per unit capacity, and weighting/cost factors and/or trend information associated with greenhouse gas emissions and/or local environmental impact.

In this way, a transport network may be architected away from being a limiting, bespoke design for a defined set of services to being a next generation, multi-service transport platform that is flexible, intelligent, open, and power efficient. A network operator can easily select service routes based on power efficiency and/or environmental impact, thereby reducing overall network power utilization and therefore their carbon footprint. As electrical power is an operational cost to network operators, optimal or desirable power routing, as described herein, also provides direct commercial benefits.

In one or more embodiments, an individual domain management controller may be capable of implementing some or all of the above-described functionality of the central domain controller. This would be useful in a case where there is only a single domain and no central domain controller is involved. As an example, an individual domain management controller may be configured to identify desired service requirements, collect power-related data from network elements in the domain, determine power-related metric(s) associated with candidate service routes that involve those network elements, and/or cause the identified candidate service routes and their corresponding metric(s) to be presented or provided for user/system selection. In some cases, domain management controllers of multiple domains may be configured to communicate with one another in a peer-to-peer manner. In these cases, one or more these domain management controllers may be configured to identify desired service requirements, collect power-related data for network elements in the domain as well as for network elements in other domain(s) (i.e., by coordinating with domain management controller(s) of those other domain(s) over the peer-to-peer network), determine power-related metric(s) associated with candidate service routes that involve those network elements, and/or cause the identified candidate service routes and their corresponding metric(s) to be presented or provided for user/system selection.

In one or more embodiments, individual network elements may be capable of implementing some or all of the above-described functionality of the central domain controller. For instance, a network element may be configured to identify desired service requirements, collect power-related data from other network elements in its domain and other domains (e.g., if there are multiple domains), determine power-related metric(s) associated with candidate service routes that involve those network elements, and/or cause the identified candidate service routes and their corresponding metric(s) to be presented or provided for user/system selection. Accordingly, in various embodiments, each network element and/or each domain management controller may be configured with the above-described functionalities, such that all of these devices may arrive the same set of candidate service routes and corresponding power-related metric(s) for a given service request.

One or more aspects of the subject disclosure include a device, comprising a processing system including a processor, and a memory that stores executable instructions that, when executed by the processing system, facilitate performance of operations. The operations can include, responsive to a request for an end-to-end service, obtaining power-related data for each of a plurality of network elements. Further, the operations can include identifying a set of candidate service routes that is each associated with a respective subset of the plurality of network elements. Further, the operations can include, for each of the candidate service routes, calculating at least one power metric based on the power-related data of each network element in the respective subset associated with that candidate service route, resulting in a plurality of power metrics. Further, the operations can include presenting or utilizing the plurality of power metrics to facilitate selection of a desirable service route from the set of candidate service routes for the end-to-end service.

One or more aspects of the subject disclosure include a non-transitory machine-readable medium, comprising executable instructions that, when executed by a processing system including a processor, facilitate performance of operations. The operations can include, responsive to a request for an end-to-end service, obtaining power-related data for each of a plurality of network elements. Further, the operations can include identifying a set of candidate service routes that is each associated with a respective subset of the plurality of network elements. Further, the operations can include, for each of the candidate service routes, calculating at least one power metric based on the power-related data of each network element in the respective subset associated with that candidate service route, resulting in a plurality of power metrics. Further, the operations can include presenting or utilizing the plurality of power metrics to facilitate selection of a desirable service route from the set of candidate service routes for the end-to-end service.

One or more aspects of the subject disclosure include a method. The method can comprise, responsive to a request for an end-to-end service, obtaining, by a processing system including a processor, power-related data for each of a plurality of network elements. Further, the method can include identifying, by the processing system, a set of candidate service routes that is each associated with a respective subset of the plurality of network elements. Further, the method can include, for each of the candidate service routes, calculating, by the processing system, at least one power metric based on the power-related data of each network element in the respective subset associated with that candidate service route, resulting in a plurality of power metrics. Further, the method can include presenting or utilizing, by the processing system, the plurality of power metrics to facilitate selection of a desirable service route from the set of candidate service routes for the end-to-end service.

Other embodiments are described in the subject disclosure.

FIG. 1 is a high-level block diagram illustrating an example, non-limiting embodiment of a system 100 functioning within, or operatively overlaid upon, a multi-domain communications network in accordance with various aspects described herein.

As shown in FIG. 1, the system 100 may include a central domain controller 102, one or more domain management controllers 104, and one or more network domains 106. In exemplary embodiments, the central domain controller 102 may be an SDN controller that abstracts the underlying network infrastructure, allowing for centralized management, automation, and/or policy enforcement across the network domains 106. In one or more embodiments, the central domain controller 102 may be configured with network management system functionality. As shown, the central domain controller 102 may interface (e.g., via one or more open APIs) with the individual domain management controllers 104. Each domain management controller 104 may manage an associated network domain 106. The network domains 106 may include any sort of networks, including, for example, submarine-based networks, terrestrial networks, edge networks, etc. For instance, a network may operate over wires or cables or may operate wirelessly over radio frequency (RF). Each network domain may include various network elements (or nodes) 108, which may include routers, switches, servers, gateways, transponders, terminals, amplifiers, and multiplexers, photonic equipment, and/or other network-related systems/devices/components. In one or more embodiments, each domain management controller 104 may (e.g., in coordination with the central domain controller 102) perform various functions, such as monitoring, updating, and/or troubleshooting network elements 108. Additionally, or alternatively, each domain management controller 104 may (e.g., in coordination with the central domain controller 102) be capable of managing physical, virtual, and/or hybrid networks.

Although not shown, in some embodiments, the system 100 may be equipped with functionality that allows network operators (e.g., users) to manage and view their service configurations and candidate service paths. For instance, a client user may employ an application that communicates with or interfaces with (e.g., via one or more APIs) the central domain controller 102, one or more of the domain management controllers 104, and/or one or more of the network elements 108 for submitting service requests and obtaining information regarding candidate service routes. Other functionality may be provided by the application to enable the client user to manage the overall service delivery.

In various embodiments, the system 100 may be configured with one or more artificial intelligence (AI) algorithms for automating service creation and deployment. For instance, one or more AI algorithms may be configured to automatically collect and assess (e.g., in real-time, near real-time, or otherwise) network element capabilities and status as well as their power-related data, automatically determine which candidate service paths to present to a user (e.g., based on the user's historical preferences relating to geographic regions that ought to (or ought not to) be involved in providing the user's desired services), and/or the like. In certain embodiments, the system 100 may be capable of performing self-healing/self-restoring of services in the event of service issues, such as cable-related or frequency-related faults.

In exemplary embodiments, edge-to-edge network segments (e.g., submarine, terrestrial, etc.) may be configured to advertise their power-related data (e.g., power efficiency information) via their respective APIs. There may be instances where a service spans multiple transport networks owned by different operators, in which case APIs advantageously enable each network segment to advertise its associated power-related data to the central domain controller 102. In any case, the central domain controller 102 may leverage the advertised data to identify candidate service paths in alignment with the service requirements, and may provide an indication to a network operator user of the power efficiency associated with candidate service route options through the network. This is analogous to modern global positioning system (GPS)-based routing systems where a range of route options are provided to a user traveling from one place to another.

As depicted in FIG. 1, the system 100 may include dynamic transport functionality 105, various aspects of which may be implemented in the central domain controller 102, the domain management controller(s) 104, and/or the network element(s) 108. As shown by reference number 110, the central domain controller 102 may receive a service request (e.g., from network operator user). At 112, the central domain controller 102 may determine the end-to-end service power usage/characteristics throughout the network for each identified candidate service path. This determination can be made in any suitable manner. For instance, the following steps illustrate an example method for making such a determination:

a. Determine the network elements that are in each identified candidate path.
b. Dynamically obtain or read the power-related data provided by each network element (e.g., from prestored information in the central domain controller 102, from prestored information in the domain management controllers 104 retrieved via API(s), and/or from prestored information in the individual network elements retrieved via API(s) and/or other communication interface(s)).
c. Knowing the capacity supported by each network element (e.g., an inline amplifier (ILA) can carry 50 wavelengths), divide the power of each network element by its capacity to obtain the per wave power.
d. The per wave power of all network elements on the path are summed to determine the end-to-end wave path power.
e. The rate that the wavelength is able to operate at is determined, and the power per bit is calculated.
f. Multiply the path power per bit by the actual required service capacity to obtain the end-to-end power usage.
g. Divide the per wave power by the actual path capacity required to obtain the power requirement.

Figure 2A:
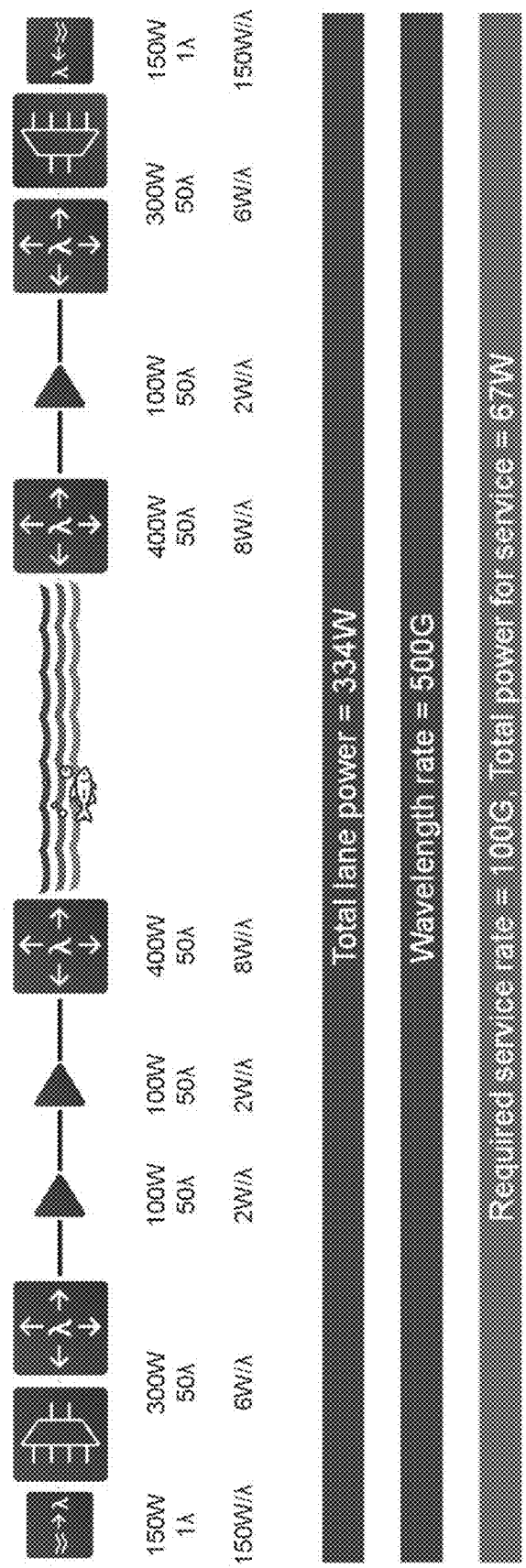
FIG. 2A illustrates a non-limiting example of an end-to-end measurement involving various power-related parameters in accordance with various aspects described herein.

FIG. 2A illustrates a non-limiting example of an end-to-end measurement involving various power-related parameters in accordance with various aspects described herein. In this simplified route example are end transponders, terminals, line amplifiers, and intermediate Reconfigurable Optical Add-Drop Multiplexer (ROADM) nodes. Here, each node may dynamically determine its current power utilization and communicate this information to a domain management controller (or network management system), which can, in turn, correlate the node with its total capacity potential to calculate energy efficiency, such as the real-time power per bit (or watts (W) per Wavelength as shown in FIG. 2A). For a given route involving multiple nodes, the controller may add the determined power for (e.g., all of) such nodes to determine the total route power, determine the ratio of the service rate and the end-to-end wavelength rate, and provide information regarding the end-to-end service route power. In the example depicted in FIG. 2A, key parameters may include total lane power=334 W, wavelength rate=500 G, and required service rate=100 G, where total power/100 G service=67 W. Of course, various power-related metrics may be determined for candidate service routes, as described in more detail below.

Figure 2B:
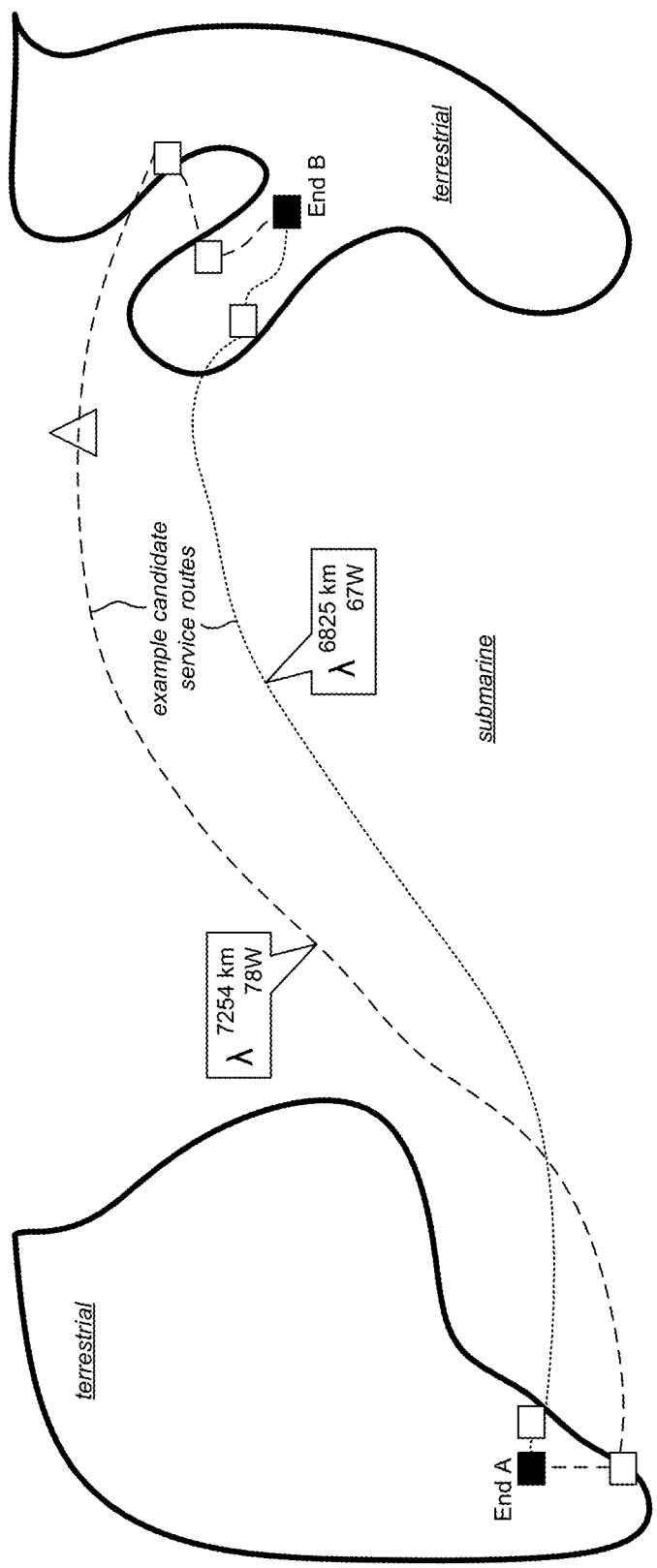
FIG. 2B illustrates an example presentation of selectable candidate service routes and their corresponding power-related values or metrics in accordance with various aspects described herein.

Returning to FIG. 1, at 114, the central domain controller 102 may provide the candidate service path options to the user (or to a selection system, such as a routing algorithm in the central domain controller 102) along with determined power usage info for selection. At 116, the central domain controller 102 may facilitate deployment of the end-to-end service based on the selection. In this way, the dynamic transport functionality 105 may enable potential service routes (across the transport network) and their corresponding power-related metric(s) to be dynamically determined and presented (graphically or otherwise), thereby allowing for user/system selection according to desired power characteristics. For instance, a routing algorithm may choose the service path that is the most optimal or power efficient. An example presentation of selectable candidate service routes and their corresponding power-related metrics is shown in FIG. 2B. In some embodiments, one or more relevant key performance indicators (KPIs) associated with the service path options may also be provided for user review or system consideration.

In exemplary embodiments, the central domain controller 102, the domain management controller(s) 104, and/or the network elements 108 may determine and/or provide an estimate of the power consumed per service for a given network element. In one or more embodiments, estimates may be made based on one or more models—e.g., a model of the power consumption of the network element (and each of any supporting components) for a particular type of service. In these embodiments, the power consumption attributed to each service or new service requested may be calculated. Of course, this may require knowledge of how carrying traffic adds to the power requirements of the network element, but provides an accurate way to calculate power metric(s). In some embodiments, estimates may be based on current power/resource utilization. In these embodiments, current power draw may be obtained based on readings of voltage and/or current on or from power cards (e.g., in each shelf or unit)—e.g., totaled in watts and divided by the current supported capacity, such as in terabits per second (Tbps). This technique can be used to approximate the additional power required for new services when routed, providing for a conservative estimate since it ignores zero-traffic power consumption. In other embodiments, estimates may be based on "fulfill" worst case—e.g., using the rated power draw of the network element (i.e., total worst case power requirement) and the fulfill capacity, the power consumption per unit of traffic supported may be calculated. This technique may also provide a conservative estimate since power consumption may be overestimated. However, the calculation is simple and results in a fixed value. Further, the method does not require detailed knowledge of node implementation.

Thus, to facilitate service route selection from a cost standpoint, the dynamic transport functionality 105 may rank candidate service routes (or bias candidate service route selection) based on the total or aggregate power consumption/utilization by the network elements 108 in those individual routes. In other words, the dynamic transport functionality 105 may operate on the assumption that lower power consumption/utilization is better, and use the simple knowledge of the fraction of the power that is consumed/utilized (e.g., for a particular service) by network elements 108 in different routes to sort candidate service routes, recommend certain candidate service routes, and/or select a service route with the "best" (i.e., lowest total or aggregate power consumption/utilization).

In one or more embodiments, the dynamic transport functionality 105 may additionally, or alternatively, rank candidate service routes (or bias candidate service route selection) based on the type or source of power that is consumed by one or more of the network elements 108 in those individual routes and/or based on an environmental impact associated with powering of one or more of the network elements 108 in those individual routes. In these embodiments, power metrics may include greenhouse gas emission factor (e.g., grams of carbon dioxide ($CO_2$) per kilowatt-hour (g $CO_2$/kWh)) and/or local environmental impact factor. With knowledge of the type of power generation, the greenhouse gas emission factor may be derived and provided to the central domain controller 102. When combined with power per unit traffic estimate(s) from nodes, for instance, the dynamic transport functionality 105 may calculate the $CO_2$ emission impact of various routing decisions. In certain embodiments, the dynamic transport functionality 105 may calculate or track a network-wide greenhouse gas emission factor (e.g., a kg of $CO_2$ per annum) over time to use as a scorecard for users to assess their impact over time. Local environmental impact factor may include how sensitive the local environment is to effluent from power generation. Such a metric may change according to the time of year or other environmental conditions, such as average daily temperature, etc. This solves a well-known issue that some locations are not well suited for placing equipment—e.g., regenerators in remote locations—and allows the routing engine to avoid the impact of doing so. The foregoing metrics can reveal the benefit and sustainability of employing newer generations of equipment that have lower power per bit (e.g., per second); that is, even as capacity is increasing, it may show a sub-linear impact on environmental factors.

Information regarding the power type/source (e.g., for the greenhouse gas emission factor) and/or the environmental impact (e.g., for the environmental impact factor) associated with a given network element 108 or set of network elements 108 may be stored in the network element(s) 108 themselves, in an environmental control server/system that is located at a network location that includes the network element(s) 108, in a domain management controller 104 that manages those network element(s) 108, and/or in the central domain controller 102. Data regarding the power type/source used for powering network element(s) 108 and/or data regarding the "sustainability" of the power feed may be obtained in any suitable manner, such as by accessing database(s) that store information or reports regarding local power plants, accessing environmental sensors for (e.g., real-time or near real-time) measurements, and/or the like. Power type/source and environmental impact metrics enhance the ability to differentiate candidate service routes beyond based on mere network element power consumption/utilization. This is especially useful in cases where the mere power consumption/utilization-based metrics or scores of different service routes happen to be equal or comparable. In certain embodiments, the dynamic transport functionality 105 may assign different weights or costs to different types or sources of power and/or different weights or costs to different levels of environmental impact, and may aggregate these weights or costs for individual candidate service routes. In these embodiments, a lower total weight or cost for a candidate service route would indicate or suggest that powering of network element(s) 108 in the route has a lower impact on the environment. For instance, the dynamic transport functionality 105 may determine a lower weight or cost for a network element 108 that is powered using solar energy as compared to another network element 108 that is powered using a $CO_2$-generating power source. As another example, in a case where two network elements 108 are powered by respective $CO_2$-generating power sources, the dynamic transport functionality 105 may determine a lower weight or cost for the network element whose power source generates less amounts of $CO_2$. As yet another example, in a case where two network elements 108 are powered by respective power sources that generate similar amounts of $CO_2$ (e.g., $CO_2$ amounts that are within a threshold difference from one another), the dynamic transport functionality 105 may determine a higher weight or cost for the network element whose power generation involves disposal of effluent into a determined vulnerable ecosystem. In this way, real-time or near real-time network element power utilization data may include power-related weighting factor(s) (or information usable to determine such factor(s)) that can aid the selection of a suitable service route.

In various embodiments, the dynamic transport functionality 105 may (e.g., as part of step 114 of FIG. 1) apply thresholding on the aforementioned determined weights or costs, and visually represent this to distinguish network elements 108 that are "green" from those that are not. For instance, those network elements 108 whose weight(s) or cost(s) satisfy certain threshold(s) may be presented with a green leaf icon or any other suitable visually distinguishing indicator in the display, while other network elements 108 whose weight(s) or cost(s) do not satisfy such threshold(s) (e.g., deemed to have a more serious environmental impact) may not be presented with such an indicator. In any case, the dynamic transport functionality 105 (or a user) can thus assess the total fraction of energy consumed by the network elements as a result of the routed demand that is attributed to "green-sourced" network elements and prioritize those routes accordingly or as desired. While it may seem reasonable to sort candidate service routes based on the "most green energy," this might not minimize environmental impact. Thus, in certain embodiments, the system may sort (and/or recommend) candidate service routes based on the "least non-green energy consumed." This is expected to work well even in situations where, to satisfy a demand of a certain size, some routes need to have different numbers of transponders that either add up to the total capacity or that regenerate to compensate for increased distance of some routes. The impact of the number and locations of transponders may be automatically accounted for in such a least non-green energy metric.

Some SDN controllers route channels using a routing, modulation, and spectral assignment (RMSA) algorithm, which generally involves the following: Step A: Routing: Finding a set of paths through the network from a specified source to destination. This is normally a Dijkstra search for the k-shortest paths between the two nodes, where k is an integer chosen by the system or user. Networks with more mesh connections can use higher values of k to expose many alternate routes.

- Step B: Modulation: Each, or a subset, of the k-routes are assessed for the signal-to-noise-ratio (SNR) delivered by that path. The SNR is usually some estimated value which takes into account the aging, repair, and other margins in the network such that there is a sufficient level of stability for the channel. The modulation format can include the baud, the constellation, and the encoding for the transponder. The modulation format is then chosen to meet some metric, for example:
    For maximizing the delivered capacity for the hardware being deployed;
    For meeting the minimum capacity of the demand being routed.

If the path cannot meet the chosen criteria, it is marked as non-viable.

- Step C: Spectral Assignment: Each path is then assessed for available spectrum which satisfies the modulation chosen. If there is insufficient spectrum for a given path, it is marked as non-viable.
- Step D: Path selection: Normally, the first path assessed is the shortest path available. If this path is not marked non-viable in any previous step, it is selected. If not selected, the next path is assessed and so on.

The foregoing is just one example of RMSA and while most follow a similar flow, the details may be different to achieve different network results, such as resiliency, total capacity, etc.

In one or more embodiments, the dynamic transport functionality 105 may be configured to automatically select a service route from a set of candidate service routes. The dynamic transport functionality 105 may perform this in coordination with one or more systems/entities within the central domain controller 102. In various embodiments, a weight/cost may be generated and associated with (or assigned to) candidate service routes (e.g., as the candidate routes are assessed), where the weight/cost may be evaluated in addition to or as part of the flow above when selecting from the set of k-paths. As an example, a weight/cost may be defined to represent the energy metric or metrics of choice, and may be used to sort the paths to achieve a desired outcome. Weight/cost generation and/or usage may be perform between Steps C and D above to add in the energy metric as a factor. Here, after Step C, the demands may be sorted by this metric prior to proceeding to Step D, where the first path assessed for selection would be the one with the best energy performance, and so on.

While it is known that the energy consumed by a photonic line system (i.e., ROADM/ILA components), for instance, is not highly affected by the number of channels traversing the system, the choice of routing can nevertheless affect the network in a beneficial way. As a network grows, the links become filled. When a specific route becomes a significant blocker in terms of the available spectrum, it is normal practice to over-build this route with a new set of amplifiers and ROADM components. This is called an additional rail in the field. By biasing the routing to paths that are most advantageous from a power or green energy point of view, as described herein, the most likely additional rails will be built in those areas that are favorable for green energy. In an extreme case, an operator can consider removing portions of the network that are energy unfavorable in preference for routes that have a lesser environmental impact. In another case, one can design the dynamic transport system such that it uses non-green paths only in the case that a green path fails. The non-green path can be kept in a low power standby mode or turned off completely, waiting for the time when a failure causes it to be put temporarily in service.

The dynamic transport functionality 105 has been generally described as relating to or implemented in the central domain controller 102, where network elements 108 identify and provide power-related metrics (including those concerning sustainability/impact, etc.) to corresponding domain management controllers 104 for forwarding to the central domain controller 102. It is to be understood and appreciated, however, that some or all of these functionalities may additionally, or alternatively, be associated with or performed by one or more of the individual domain management controllers 104 and/or the individual network elements 108. For instance, in a case where multiple domain management controllers 104 corresponding to multiple domains are coupled to one another in a peer-to-peer configuration, the domain management controllers 104 may exchange network element power-/capacity-related information with one other, allowing for any of the controllers to determine possible routes through the transport network (e.g., that have sufficient capacity based on the service requirements), calculate power-related metric(s) for the various network elements in the different domains to identify end-to-end power metric impact of the service for those possible routes, and cause some or all of the identified candidate service routes and their corresponding power-related values or metric(s) to be provided to a user or routing system or algorithm for review/selection. As another example, individual network elements (e.g., one or more of a source network element and a destination element corresponding to a desired service request) may be configured to identify desired service requirements, collect power-related data for itself and for other network elements in its domain and/or other domain(s) (whether by requesting such data from those other network elements or associated systems or by accessing information that has been previously obtained via network flooding or the like and stored in one or more data structures such as network table(s)), determine power-related metric(s) associated with candidate service routes that involve those network elements, and/or cause the identified candidate service routes and their corresponding metric(s) to be presented or provided for user/system selection.

It is to be understood and appreciated that, although one or more of FIGS. 1 and 2A might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various controllers, systems, elements, devices, components, etc. may have been illustrated in one or more of FIGS. 1 and 2A as separate controllers, systems, elements, devices, components, etc., it will be appreciated that multiple controllers, systems, elements, devices, components, etc. can be implemented as a single controller, system, element, device, component, etc., or a single controller, system, element, device, component, etc. can be implemented as multiple controllers, systems, elements, devices, components, etc. Additionally, functions described as being performed by one controller, system, element, device, component, etc. may be performed by multiple controllers, systems, elements, devices, components, etc., or functions described as being performed by multiple controllers, systems, elements, devices, components, etc. may be performed by a single controller, system, element, device, component, etc.

Furthermore, the system 100 of FIG. 1 can include various configurations with various quantities of components and/or types of components. In cases where network domains include cell configurations, for instance, the network domain(s) may include heterogeneous cell configurations with various quantities of cells and/or types of cells.

Figure 2C:
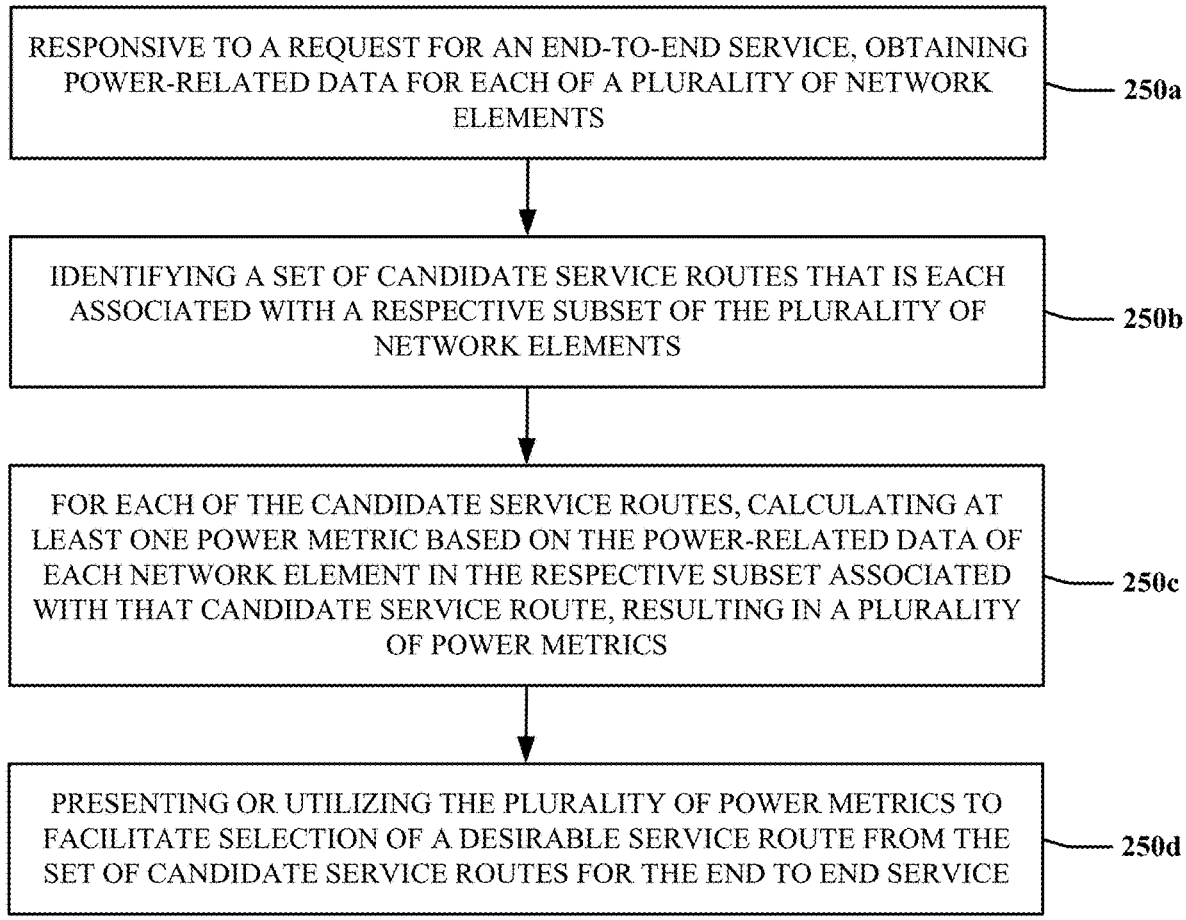
FIG. 2C depicts an illustrative embodiment of a method in accordance with various aspects described herein.

FIG. 2C depicts an illustrative embodiment of a method 250 in accordance with various aspects described herein.

At 250a, the method can include, responsive to a request for an end-to-end service, obtaining power-related data for each of a plurality of network elements. For example, one or more of the central domain controller 102, the domain management controller(s) 104, and the network element(s) 108 may similar to that described above, perform one or more operations that include, responsive to a request for an end-to-end service, obtaining power-related data for each of a plurality of network elements.

At 250b, the method can include identifying a set of candidate service routes that is each associated with a respective subset of the plurality of network elements. For example, one or more of the central domain controller 102, the domain management controller(s) 104, and the network element(s) 108 may similar to that described above, perform one or more operations that include identifying a set of candidate service routes that is each associated with a respective subset of the plurality of network elements.

At 250c, the method can include, for each of the candidate service routes, calculating at least one power metric based on the power-related data of each network element in the respective subset associated with that candidate service route, resulting in a plurality of power metrics. For example, one or more of the central domain controller 102, the domain management controller(s) 104, and the network element(s) 108 may similar to that described above, perform one or more operations that include, for each of the candidate service routes, calculating at least one power metric based on the power-related data of each network element in the respective subset associated with that candidate service route, resulting in a plurality of power metrics.

At 250d, the method can include presenting or utilizing the plurality of power metrics to facilitate selection of a desirable service route from the set of candidate service routes for the end-to-end service. For example, one or more of the central domain controller 102, the domain management controller(s) 104, and the network element(s) 108 may similar to that described above, perform one or more operations that include presenting or utilizing the plurality of power metrics to facilitate selection of a desirable service route from the set of candidate service routes for the end-to-end service.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100 and method 250 presented in FIGS. 1 and 2C. For example, virtualized communications network 300 can facilitate, in whole or in part, flexible, open, intelligent, and power efficient deployment of edge-to-edge services across different network domains, as described herein.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of various network elements in various network domains. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element, such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access, wireless access, voice access, media access and/or access to content sources for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
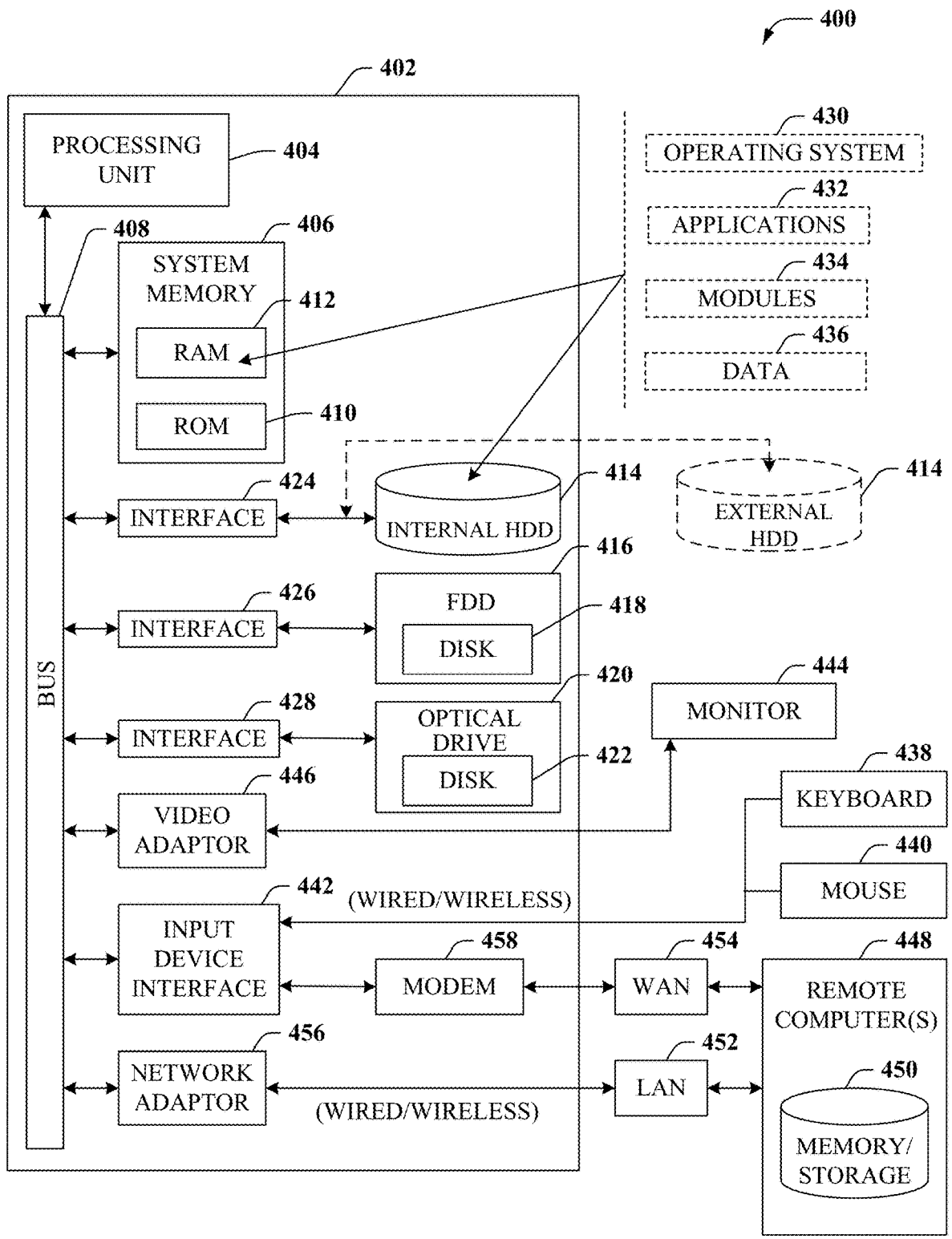
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements, access terminals, base stations or access points, switching devices, media terminals, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, flexible, open, intelligent, and power efficient deployment of edge-to-edge services across different network domains, as described herein.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

In various embodiments, the AI or ML algorithm(s) described herein may be configured to reduce any error in the derivations of associations/mappings, predictions of optimal (best) chains, appropriate action(s) to take, and so on. In this way, any error that may be present may be provided as feedback to the algorithm(s), such that the error may tend to converge toward zero as the algorithm(s) are utilized more and more.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for conducting various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized. It is also to be understood and appreciated that the subject matter in one or more dependent claims may be combined with that in one or more other dependent claims.

What is claimed is:

1. A device, comprising:
a processing system including a processor; and
a memory that stores executable instructions that, when executed by the processing system, facilitate performance of operations, the operations comprising:
responsive to a request for an end-to-end service, obtaining network element power-related data from multiple domain management controllers that each manages network elements in a respective domain of a network, resulting in power-related data for each of a plurality of network elements;
identifying a set of candidate service routes that is each associated with a respective subset of the plurality of network elements;
for each of the candidate service routes, calculating at least one power metric based on the power-related data of each network element in the respective subset associated with that candidate service route, resulting in a plurality of power metrics; and
presenting or utilizing the plurality of power metrics to facilitate selection of a desirable service route from the set of candidate service routes for the end-to-end service.

2. The device of claim 1, wherein the at least one power metric for each of the candidate service routes is calculated at least in part by aggregating the power-related data of each network element in the respective subset associated with that candidate service route.

3. The device of claim 1, wherein the power-related data for each of the plurality of network elements comprises:
power consumed per service for that network element derived based on one or more models corresponding to a type of that network element;
current power utilization by that network element calculated based on current power draw by that network element and a current supported capacity of that network element;
power consumption per unit traffic of that network element calculated based on a rated power draw by that network element and a fulfill capacity of that network element; or
a combination thereof.

4. The device of claim 1, wherein the at least one power metric for each of the candidate service routes is calculated based at least in part on:
  power consumption by one or more of the network elements in the respective subset associated with that candidate service route;
  a type or source of power utilized by the one or more of the network elements;
  environmental impact associated with powering of the one or more of the network elements; or
  a combination thereof.

5. The device of claim 1, wherein the at least one power metric for the desirable service route comprises:
  a lowest cost value relating to power consumption by one or more of the network elements in the respective subset associated with the desirable service route;
  a lowest cost value relating to a type or source of power utilized by the one or more of the network elements;
  a lowest cost value relating to environmental impact associated with powering of the one or more of the network elements; or
  a combination thereof.

6. The device of claim 1, wherein the at least one power metric for each of the candidate service routes comprises an end-to-end service route power that is calculated based on a required service rate and a sum of power per bit values or power per wavelength values for the network elements in the respective subset associated with that candidate service route.

7. The device of claim 1, wherein the end-to-end service is across multiple domains of the network.

8. The device of claim 1, wherein the device comprises a software defined network (SDN) controller.

9. The device of claim 1, wherein one respective domain of the network comprises a submarine optical network domain, and wherein another respective domain of the network comprises a terrestrial radio frequency (RF network domain.

10. The device of claim 1, wherein the presenting involves displaying visual cues for candidate service routes associated with environmental impact costs that satisfy one or more thresholds.

11. The device of claim 10, wherein a network element of the plurality of network elements comprises a router, a switch, a server, a gateway, a transponder, a terminal, an amplifier, and a multiplexer, a photonic equipment, or a combination thereof.

12. The device of claim 1, wherein the obtaining involves use of one or more open application programming interfaces (APIs).

13. A non-transitory machine-readable medium, comprising executable instructions that, when executed by a processing system including a processor, facilitate performance of operations, the operations comprising:
  responsive to a request for an end-to-end service, obtaining network element power-related data from multiple domain management controllers that each manages network elements in a respective domain of a network, resulting in power-related data for each of a plurality of network elements;
  identifying a set of candidate service routes that is each associated with a respective subset of the plurality of network elements;
  for each of the candidate service routes, calculating at least one power metric based on the power-related data of each network element in the respective subset associated with that candidate service route, resulting in a plurality of power metrics; and
  presenting or utilizing the plurality of power metrics to facilitate selection of a desirable service route from the set of candidate service routes for the end-to-end service.

14. The non-transitory machine-readable medium of claim 13, wherein the at least one power metric for each of the candidate service routes is calculated at least in part by aggregating the power-related data of each network element in the respective subset associated with that candidate service route, and wherein the power-related data for each of the plurality of network elements comprises:
  power consumed per service for that network element derived based on one or more models corresponding to a type of that network element;
  current power utilization by that network element calculated based on current power draw by that network element and a current supported capacity of that network element;
  power consumption per unit traffic of that network element calculated based on a rated power draw by that network element and a fulfill capacity of that network element; or
  a combination thereof.

15. The non-transitory machine-readable medium of claim 13, wherein the at least one power metric for the desirable service route comprises:
  a lowest cost value relating to power consumption by one or more of the network elements in the respective subset associated with the desirable service route;
  a lowest cost value relating to a type or source of power utilized by the one or more of the network elements;
  a lowest cost value relating to environmental impact associated with powering of the one or more of the network elements; or
  a combination thereof.

16. The non-transitory machine-readable medium of claim 13, wherein the at least one power metric for each of the candidate service routes comprises an end-to-end service route power that is calculated based on a required service rate and a sum of power per bit values or power per wavelength values for the network elements in the respective subset associated with that candidate service route.

17. A method, comprising:
  responsive to a request for an end-to-end service, obtaining, by a processing system including a processor, network element power-related data from multiple domain management controllers that each manages network elements in a respective domain of a network, resulting in power-related data for each of a plurality of network elements;
  identifying, by the processing system, a set of candidate service routes that is each associated with a respective subset of the plurality of network elements;
  for each of the candidate service routes, calculating, by the processing system, at least one power metric based on the power-related data of each network element in the respective subset associated with that candidate service route, resulting in a plurality of power metrics; and
  presenting or utilizing, by the processing system, the plurality of power metrics to facilitate selection of a desirable service route from the set of candidate service routes for the end-to-end service.

18. The method of claim 17, wherein the at least one power metric for each of the candidate service routes is calculated at least in part by aggregating the power-related data of each network element in the respective subset associated with that candidate service route, and wherein the power-related data for each of the plurality of network elements comprises:

power consumed per service for that network element derived based on one or more models corresponding to a type of that network element;

current power utilization by that network element calculated based on current power draw by that network element and a current supported capacity of that network element;

power consumption per unit traffic of that network element calculated based on a rated power draw by that network element and a fulfill capacity of that network element; or a combination thereof.

19. The method of claim 17, wherein the at least one power metric for each of the candidate service routes is calculated based at least in part on:

power consumption by one or more of the network elements in the respective subset associated with that candidate service route;

a type or source of power utilized by the one or more of the network elements;

environmental impact associated with powering of the one or more of the network elements; or a combination thereof.

20. The method of claim 17, wherein the at least one power metric for the desirable service route comprises:

a lowest cost value relating to power consumption by one or more of the network elements in the respective subset associated with the desirable service route;

a lowest cost value relating to a type or source of power utilized by the one or more of the network elements;

a lowest cost value relating to environmental impact associated with powering of the one or more of the network elements; or a combination thereof.

* * * * *